(12) United States Patent
Renke et al.

(10) Patent No.: US 9,033,403 B2
(45) Date of Patent: May 19, 2015

(54) VEHICLE, AN ASSEMBLY FOR THE VEHICLE AND A METHOD OF ASSEMBLING THE VEHICLE

(71) Applicant: GM GLOBAL TECHNOLOGY OPERATIONS LLC, Detroit, MI (US)

(72) Inventors: David T. Renke, Macomb, MI (US); Ronald Chupick, Gross Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/045,942

(22) Filed: Oct. 4, 2013

(65) Prior Publication Data

US 2015/0097396 A1  Apr. 9, 2015

(51) Int. Cl.
*B60J 1/02* (2006.01)
*B62D 65/06* (2006.01)

(52) U.S. Cl.
CPC .. *B60J 1/02* (2013.01); *B62D 65/06* (2013.01)

(58) Field of Classification Search
CPC .............. B60J 1/02; B60J 1/004; B60J 1/006; B60J 1/007
USPC ............... 296/192, 193.09, 201, 203.02, 191, 296/84.1, 85, 90, 96.21, 96.22
See application file for complete search history.

(56) References Cited

U.S. PATENT DOCUMENTS

| | | | |
|---|---|---|---|
| 4,606,159 A * | 8/1986 | Kunert | 52/208 |
| 5,451,090 A * | 9/1995 | Brodie et al. | 296/192 |
| 5,529,366 A * | 6/1996 | Gold | 296/96.21 |
| 6,193,304 B1 * | 2/2001 | Takahashi et al. | 296/192 |
| 6,193,305 B1 * | 2/2001 | Takahashi | 296/192 |
| 6,263,627 B1 * | 7/2001 | Schonenbach et al. | 52/208 |
| 6,364,404 B1 * | 4/2002 | De Paoli | 296/201 |
| 7,357,446 B2 * | 4/2008 | Sakai et al. | 296/192 |
| 8,757,706 B2 * | 6/2014 | Sasaki | 296/192 |
| 8,770,654 B2 * | 7/2014 | Schaefer | 296/192 |
| 2006/0049669 A1* | 3/2006 | Yamamoto | 296/201 |
| 2013/0033071 A1* | 2/2013 | Kurata et al. | 296/192 |
| 2013/0214560 A1* | 8/2013 | Sasaki | 296/192 |

* cited by examiner

*Primary Examiner* — Gregory Blankenship
(74) *Attorney, Agent, or Firm* — Quinn Law Group, PLLC

(57) ABSTRACT

A vehicle, an assembly for the vehicle and a method of assembling the vehicle are disclosed. The assembly includes a windshield and a panel disposed adjacent to the windshield. The assembly also includes a first retainer member secured to one of the windshield and the panel. Furthermore, the assembly includes a second retainer member secured to the other one of the windshield and the panel. Additionally, the assembly includes a third retainer member selectively attached to the first and second retainer members to selectively couple together the panel and the windshield.

20 Claims, 3 Drawing Sheets

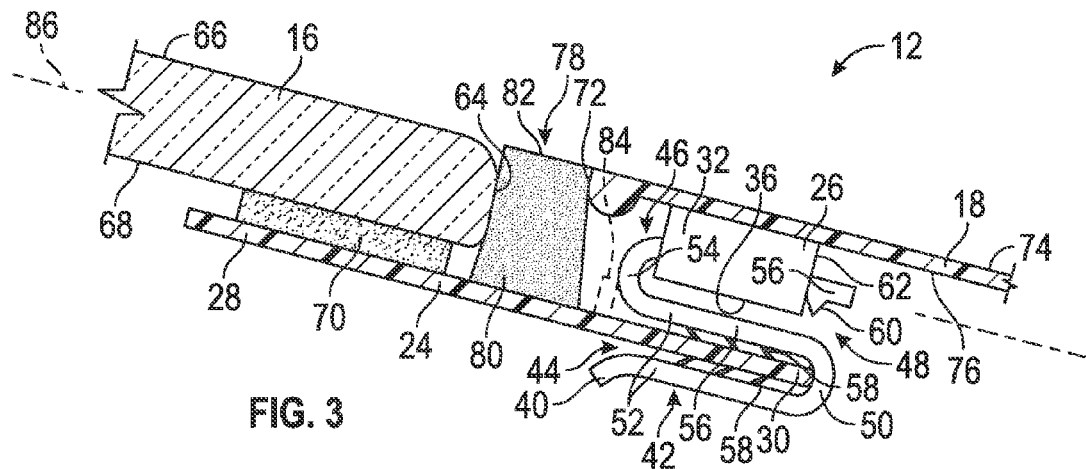
FIG. 3
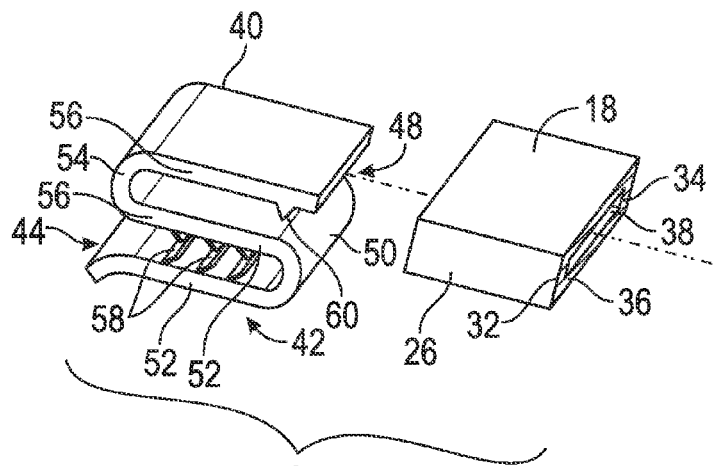
FIG. 4
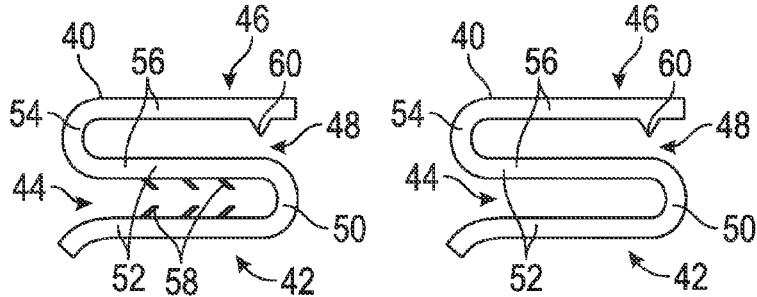
FIG. 5
FIG. 6
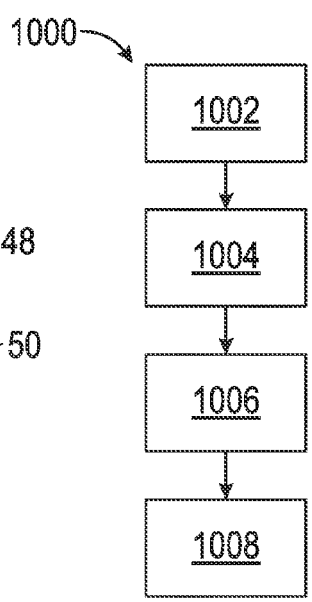
FIG. 7

VEHICLE, AN ASSEMBLY FOR THE VEHICLE AND A METHOD OF ASSEMBLING THE VEHICLE

TECHNICAL FIELD

The present disclosure relates to a vehicle, an assembly for the vehicle and a method of assembling the vehicle. More specifically, a retainer apparatus is utilized to couple together a panel and a windshield of the vehicle.

BACKGROUND

Many vehicles have a windshield and a hood adjacent to the windshield. Generally, an air intake panel is disposed between the windshield and the hood to allow air into the vehicle. The air intake panel is attached to the windshield utilizing a snap fit assembly. Specifically, the snap fit assembly includes a finger attached to the windshield, with the finger extending outwardly away from an edge of the windshield to a distal cup. The snap fit assembly also includes a projection extending outwardly from the air intake panel toward the distal cup. The projection is pressed downwardly into the distal cup and snaps into the distal cup to attach the air intake panel to the windshield. This downwardly pressing movement can cause the distal cup to deflect. Furthermore, a filler is inserted into the distal cup to maintain the configuration of the distal cup during shipping of the windshield and is removed from the distal cup before attaching the air intake panel to the windshield.

SUMMARY

The present disclosure provides an assembly for a vehicle. The assembly includes a windshield and a panel disposed adjacent to the windshield. The assembly also includes a first retainer member secured to one of the windshield and the panel. Furthermore, the assembly includes a second retainer member secured to the other one of the windshield and the panel. Additionally, the assembly includes a third retainer member selectively attached to the first and second retainer members to selectively couple together the panel and the windshield.

The present disclosure also provides a vehicle including a support structure and a windshield coupled to the support structure. The vehicle further includes a panel disposed adjacent to the windshield. The vehicle also includes a first retainer member secured to one of the windshield and the panel. Furthermore, the vehicle includes a second retainer member secured to the other one of the windshield and the panel. Additionally, the vehicle includes a third retainer member selectively attached to the first and second retainer members to selectively couple together the panel and the windshield.

The present disclosure also provides a method of assembling a vehicle. The method includes securing a first retainer member to one of a first member and a second member. Furthermore, the method includes securing a second retainer member to the other one of the first member and the second member. The method also includes selectively attaching a third retainer member to the second retainer member and selectively attaching the third retainer member to the first retainer member to couple together the first and second members. Attaching the third retainer member to the second retainer member occurs before attaching the third retainer member to the first retainer member.

Therefore, the first, second and third retainer members cooperate to easily couple together the panel and the windshield. Utilizing these retainer members can improve assembly efforts to couple together the panel and the windshield. For example, during assembly, the panel can move toward an edge of the windshield along an axis substantially parallel to the windshield which can improve ergonomic efforts, instead of requiring the air intake panel being pressed downwardly as discussed in the background section. In addition, the third retainer member being attachable and detachable allows adjustability of the panel relative to the windshield to accommodate different vehicles and various tolerances. Furthermore, the third retainer member can be detachable from the first retainer member for easy accessibility and replaceability of various components of the vehicle, such as for example, the panel.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 3 is a schematic cross-sectional view of a first retainer member, a windshield, a panel, a coupler and a strip, with a second retainer member and a third retainer member in the background, and with a stop in phantom lines.

FIG. 4 is a schematic exploded perspective view of the second retainer member and the third retainer member.

FIG. 5 is a schematic side view of the third retainer member.

FIG. 6 is a schematic side view of another embodiment of the third retainer member.

FIG. 7 is a schematic flowchart of a method of assembling the vehicle.

DETAILED DESCRIPTION

Figure 1:
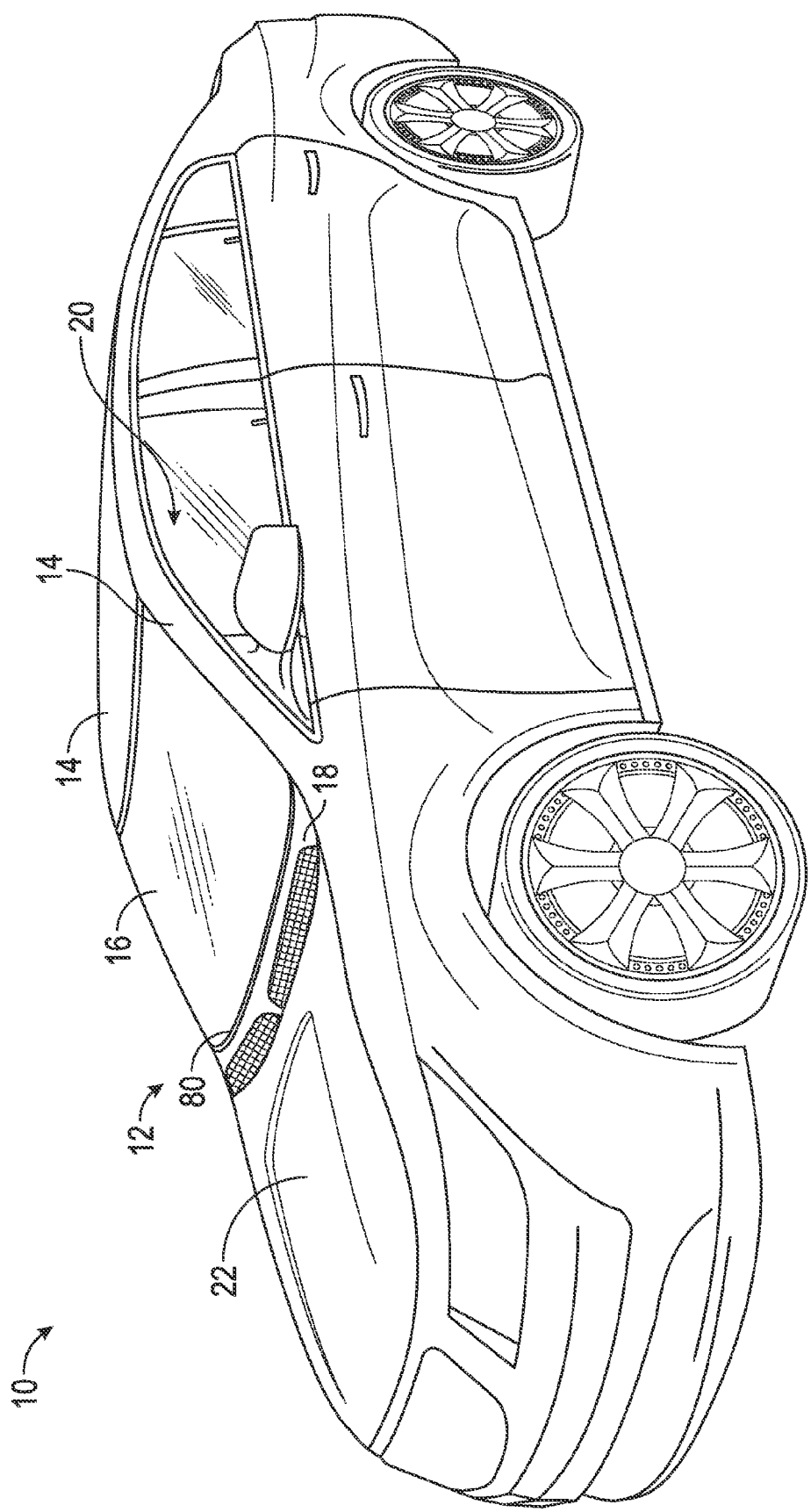
FIG. 1 is a schematic perspective view of a vehicle and an assembly for the vehicle.

Referring to the Figures, wherein like numerals indicate like or corresponding parts throughout the several views, a vehicle 10 and an assembly 12 for the vehicle 10 are generally shown in FIG. 1.

Continuing with FIG. 1, the vehicle 10 can include a support structure 14. The support structure 14 can be a frame, a chassis, a support, a body, a bracket or any other suitable support structure. Generally, the assembly 12 is coupled to the support structure 14. Therefore, the support structure 14 can support the assembly 12.

Figure 2:
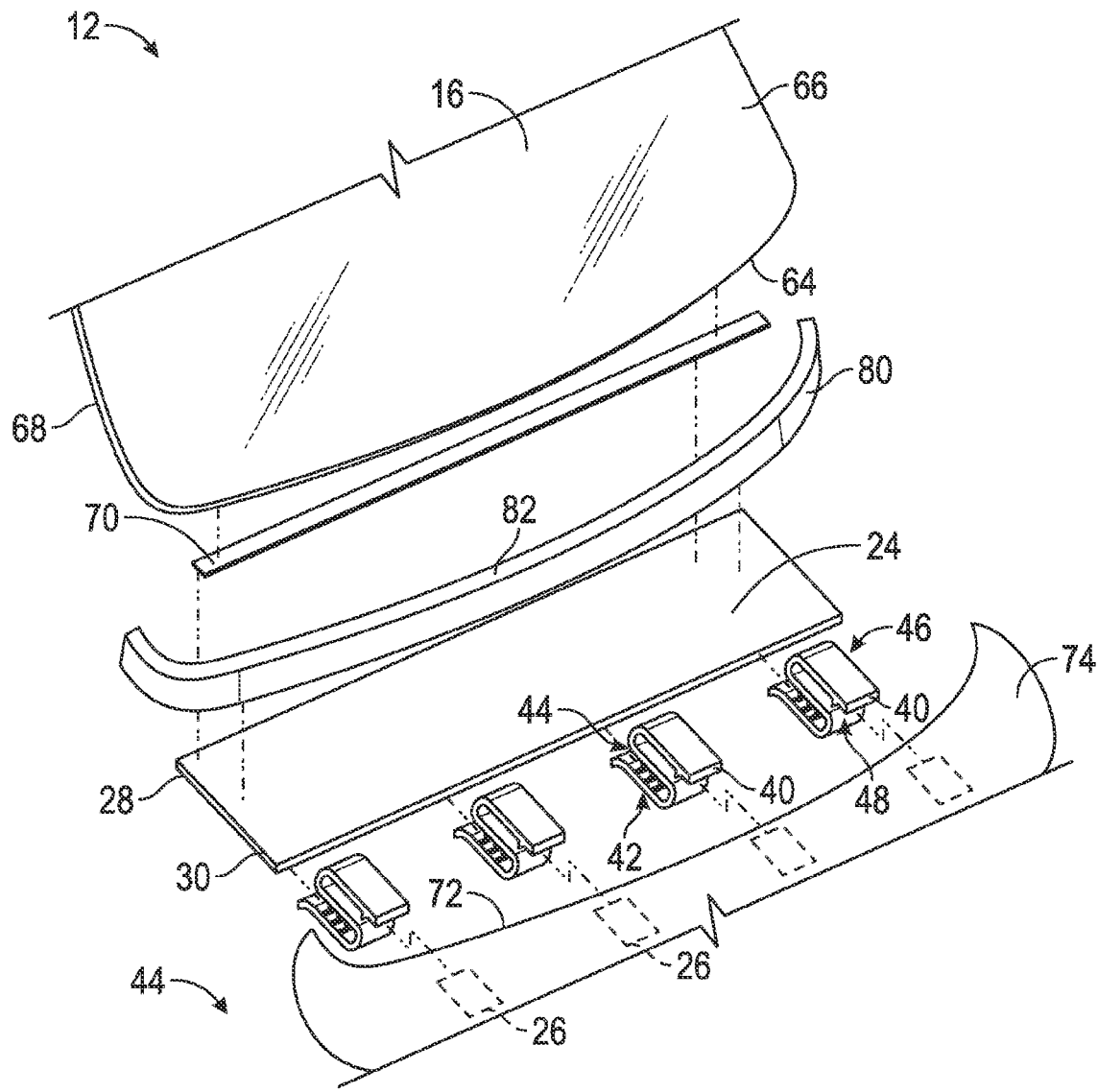
FIG. 2 is a schematic exploded-fragmentary perspective view of the assembly.

Referring to FIGS. 1 and 2, the assembly 12 includes a first member, such as a windshield 16. More specifically, the windshield 16 is coupled to the support structure 14, and thus, the windshield is supported by the support structure 14. The windshield 16 can be formed of glass, and more specifically, can be formed of laminated glass. It is to be appreciated that the windshield 16 can be formed of any suitable material(s).

Continuing with FIGS. 1 and 2, the assembly 12 further includes a second member, such as a panel 18, disposed adjacent to the windshield 16. For example, the panel 18 can be an air inlet panel that allows air to flow into various components of the vehicle 10 and/or into a passenger compartment 20 of the vehicle 10. Furthermore, the panel 18 can be a trim piece, a trim panel, a cover, etc. Generally, as shown in FIG. 1, the panel 18 is disposed between the windshield 16 and a hood 22 of the vehicle 10.

The panel 18 can be formed of various material(s). For example, the panel 18 can be formed of polymeric material (s). One suitable polymeric material for the panel 18 is thermoplastic. It is to be appreciated that the panel 18 can be formed of metal material(s) or any other suitable material(s).

Turning to FIGS. 2 and 3, the assembly 12 also includes a first retainer member 24 secured to one of the windshield 16 and the panel 18. Additionally, the assembly 12 includes a second retainer member 26 secured to the other one of the windshield 16 and the panel 18. Therefore, in one embodiment (see FIG. 3), the first retainer member 24 is secured to the windshield 16 and the second retainer member 26 is secured to the panel 18. In another embodiment, the first retainer member 24 is secured to the panel 18 and the second retainer member 26 is secured to the windshield 16.

Referring to FIG. 3, the first retainer member 24 can include a first end portion 28 secured to the windshield 16 and a second end portion 30 overlapping the panel 18 in a spaced relationship such that the second retainer member 26 is disposed between the panel 18 and the first retainer member 24. Therefore, generally, the first and second retainer members 24, 26 are spaced from each other.

The first retainer member 24 can be formed of various material(s). For example, the first retainer member 24 can be formed of polymeric material(s). One suitable polymeric material for the first retainer member 24 is thermoplastic. As another example, the first retainer member 24 can be formed of metal material(s). One suitable metal material for the first retainer member 24 is aluminum. Another suitable metal material for the first retainer member 24 is steel. It is to be appreciated that the first retainer member 24 can be formed of any other suitable material(s).

Turning to FIGS. 2 and 4, the second retainer member 26 can include a first leg 32 extending away from the panel 18 and a second leg 34 extending away from the panel 18 in a spaced relationship relative to the first leg 32. Furthermore, the second retainer member 26 can include a distal wall 36 secured to the first and second legs 32, 34. Generally, the distal wall 36 is disposed between the panel 18 and the first retainer member 24. Specifically, the distal wall 36 is spaced from the panel 18 to define a slot 38 therebetween. Furthermore, the distal wall 36 is spaced from the second end portion 30 of the first retainer member 24.

The second retainer member 26 can be formed of various material(s). For example, the second retainer member 26 can be formed of polymeric material(s). One suitable polymeric material for the second retainer member 26 is thermoplastic. It is to be appreciated that the second retainer member 26 can be formed of metal material(s) or any other suitable material (s).

In one embodiment, the panel 18 and the second retainer member 26 can be secured to each other by molding. In other words, the panel 18 and the second retainer member 26 can be formed of the same material(s). As such, the panel 18 and the second retainer member 26 can be formed of one-piece or unitary. Alternatively, the second retainer member 26 can be secured to the panel 18 by fastener(s), adhesive, or any other suitable method.

Referring to FIGS. 2-4, the assembly 12 also includes a third retainer member 40 selectively attached to the first and second retainer members 24, 26 to selectively couple together the panel 18 and the windshield 16. The first, second and third retainer members 24, 26, 40 cooperate to define a retainer apparatus coupling together the panel 18 and the windshield 16. As shown in FIG. 3, the third retainer member 40 is disposed in the slot 38 to attach the second and third retainer members 26, 40 together. Specifically, the third retainer member 40 is attachable to the second end portion 30 of the first retainer member 24 and the third retainer member 40 is attachable to the distal wall 36 of the second retainer member 26. The third retainer member 40 can be detachable from the first retainer member 24 for easy accessibility and replaceability of various components, such as for example, the panel 18. Furthermore, utilizing the first, second and third retainer members 24, 26, 40 can improve assembly efforts to couple the panel 18 to the windshield 16 during assembly of the vehicle 10, as discussed further below. In addition, the third retainer member 40 being attachable and detachable allows adjustability of the panel 18 relative to the windshield 16 to accommodate different vehicles and various tolerances, thus providing a versatile retainer apparatus. It is to be appreciated that the first and second members 16, 18 can be any suitable configuration and the windshield 16 and the panel 18 are one example. As another example, the assembly 12 can be utilized to couple the second member, such as the panel 18, to the first member, such as another panel, instead of the windshield 16; and in this embodiment, the first retainer member 24 would be secured to one of the panels instead of the windshield 16.

Turning to FIGS. 3-6, the third retainer member 40 can include a first part 42 defining a first opening 44 to receive the first retainer member 24 and a second part 46 defining a second opening 48 to receive the second retainer member 26. More specifically, the first opening 44 receives the second end portion 30 of the first retainer member 24 and the second opening 48 receives the distal wall 36 of the second retainer member 26.

The first opening 44 can be positioned in an inverted relationship with respect to the second opening 48 such that the first and second openings 44, 48 face in substantially opposite directions. Therefore, the third retainer member 40 defines a generally s-shaped configuration to present the first and second openings 44, 48 in the inverted relationship. The first part 42 can include a first base 50 and a pair of side walls 52 extending from the first base 50 in a spaced relationship to define the first opening 44 therebetween. Similarly, the second part 46 can include a second base 54 and a pair of side walls 56 extending from the second base 54 in a spaced relationship to define the second opening 48 therebetween. As such, one of the side walls 52 of the first part 42 corresponds to one of the side walls 56 of the second part 46. In other words, the first and second parts 42, 46 share one common side wall.

Optionally, as best shown in FIGS. 3 and 5, the first part 42 can include a projection 58 extending from one of the side walls 52 of the first part 42 inwardly into the first opening 44 to engage the first retainer member 24. More specifically, the projection 58 can engage the second end portion 30 of the first retainer member 24 to secure the first and third retainer members 24, 40 together. In certain embodiments, the projection 58 is further defined as a plurality of projections 58 spaced from each other and each extending from the side walls 52 of the first part 42 inwardly into the first opening 44 to engage the first retainer member 24. It is to be appreciated that any suitable number of projections 58 can be utilized and the projections 58 can be in any suitable location, and thus one or more of the projections 58 can touch each other. The projections 58 and/or the first part 42 can flex or bend to attach and detach the third retainer member 40 with the first retainer member 24. Alternatively, in another embodiment, as shown in FIG. 6, the projections 58 can be eliminated.

As best shown in FIGS. 3, 5 and 6, optionally, the second part 46 can include a tab 60 disposed through the slot 38 of the second retainer member 26 to engage an end 62 of the distal wall 36 to retain attachment between the second and third retainer members 26, 40. More specifically, one of the side walls 56 of the second part 46 can include the tab 60. For example, one of the side walls 56 of the second part 46 can be disposed in the slot 38 of the second retainer member 26 with the tab 60 disposed outside of the slot 38 to engage the end 62 of the distal wall 36. The tab 60 can extend inwardly into the second opening 48. It is to be appreciated that any suitable number of tabs 60 can be utilized and the tab 60 (s) can be in any suitable location. The tab 60 and/or the second part 46 can flex or bend to attach and detach the third retainer member 40 with the second retainer member 26.

The third retainer member 40 can be formed of various material(s). For example, the third retainer member 40 can be formed of polymeric material(s). One suitable polymeric material for the third retainer member 40 is thermoplastic. As another example, the third retainer member 40 can be formed of metal material(s). One suitable metal material for the third retainer member 40 is aluminum. Another suitable metal material for the third retainer member 40 is steel. It is to be appreciated that the third retainer member 40 can be formed of any other suitable material(s).

Turning back to FIGS. 2 and 3, the windshield 16 can include a windshield edge 64. Furthermore, the windshield 16 can include a first side surface 66 and a second side surface 68 spaced from each other. Generally, the first and second side surfaces 66, 68 oppose each other and the second side surface 68 faces the first retainer member 24. As such, the first retainer member 24 is secured to the second side surface 68. More specifically, the first end portion 28 of the first retainer member 24 is secured to the second side surface 68 of the windshield 16. In certain embodiments, the first retainer member 24 is secured to the second side surface 68 by a coupler 70. In one embodiment, the coupler 70 can be an adhesive tape. It is to be appreciated that the coupler 70 can be any suitable fastener(s), adhesive, urethane, etc. It is to also be appreciated that the first retainer member 24 can be secured to the windshield 16 by any suitable methods, such as for example, bonding, fastening, etc.

Continuing with FIGS. 2 and 3, the panel 18 can include a panel edge 72 facing the windshield edge 64. Furthermore, the panel 18 can include a first side 74 and a second side 76 spaced from each other. Generally, the first and second sides 74, 76 oppose each other and the second side 76 faces the first retainer member 24. The second retainer member 26 is secured to the second side 76. More specifically, the first and second legs 32, 34 are secured to the second side 76 of the panel 18. Therefore, the first and second legs 32, 34 extend outwardly away from the second side 76, with the slot 38 disposed between the second side 76 and the distal wall 36.

Furthermore, the windshield edge 64 and the panel edge 72 are spaced from each other to define a gap 78 (see FIG. 3) therebetween. The assembly 12 can further include a strip 80 secured to the first retainer member 24 and disposed in the gap 78. The strip 80 can extend outwardly away from the first retainer member 24 to a distal surface 82. More specifically, the strip 80 can be secured to the first retainer member 24 between the first and second end portions 28, 30. The strip 80 can be secured to the first retainer member 24 by fastener(s), adhesive, bonding, extruding or any other suitable methods. The strip 80 can be formed of foam, such as an open-celled foam or a closed-cell foam. It is to be appreciated that the strip 80 can be secured to the first retainer member 24 at any suitable location. Specifically, the strip 80 can be positioned to substantially remove the gap 78 between the strip 80 and the windshield edge 64 of the windshield 16.

Optionally, as shown in phantom lines in FIG. 3, a stop 84 can extend from the first retainer member 24 to limit movement of the third retainer member 40. Specifically, the stop 84 can extend upwardly toward the second side 76 of the panel 18 and the second base 54 of the third retainer member 40 selectively engages the stop 84 to limit movement of the third retainer member 40 toward the first end portion 28 of the first retainer member 24. Alternatively or additionally, engagement between the first base 50 with the second end portion 30 of the first retainer member 24 can limit movement of the third retainer member 40 toward the first end portion 28.

The first side surface 66 of the windshield 16, the first side 74 of the panel 18 and the distal surface 82 of the strip 80 cooperate to present a substantially flush appearance. Therefore, the first side surface 66 of the windshield 16, the first side 74 of the panel 18 and the distal surface 82 of the strip 80 each face outwardly away from the vehicle 10, and thus presents an aesthetical appearance to the outside of the vehicle 10. Furthermore, the first, second and third retainer members 24, 26, 40 cooperate to allow the panel 18 to be adjusted relative to the strip 80 to substantially remove the gap 78 therebetween. In other words, the panel 18 can be moved toward the strip 80 to remove the gap 78. For example, the panel 18 can engage the strip 80. Simply stated, the first, second and third retainer members 24, 26, 40 cooperate to allow adjustability of the panel 18 relative to the strip 80 such that the gap 78 is minimized and the first side surface 66 of the windshield 16, the first side 74 of the panel 18 and the distal surface 82 of the strip 80 present the substantially flush appearance.

In certain embodiments, the second retainer member 26 can be defined as a plurality of second retainer members 26. Therefore, each of the second retainer members 26 can be spaced from each other along the panel edge 72 of the panel 18. FIG. 2 illustrates the second retainer members 26 spaced from each other in phantom lines. Furthermore, the third retainer member 40 can be defined as a plurality of third retainer members 40 (see FIG. 2). One of the third retainer members 40 is secured to one of the second retainer members 26 and another one of the third retainer members 40 is secured to another one of the second retainer members 26, and so on. Each of the third retainer members 40 are secured to the same first retainer member 24. As such, the first retainer member 24 is elongated to generally extend the length of the windshield edge 64. It is to be appreciated that the strip 80 is elongated to generally extend the length of the windshield edge 64. It is to be appreciated that the number of second and third retainer members 26, 40 in FIG. 2 is for illustrative purposes only and more or less retainer members 26, 40 can be utilized.

Referring to FIG. 7, the present disclosure also provides a method 1000 of assembling the vehicle 10. The method 1000 includes securing 1002 the first retainer member 24 to one of the first member 16 and the second member 18. The method 1000 also includes securing 1004 the second retainer member 26 to the other one of the first member 16 and the second member 18. As discussed above, the first member 16 can be the windshield 16, another panel, etc., and the second member 18 can be the panel 18, etc. In one embodiment, securing 1002 the first retainer member 24 can include securing the first retainer member 24 to the windshield 16 and securing 1004 the second retainer member 26 can include securing the second retainer member 26 to the panel 18.

The method 1000 further includes selectively attaching 1006 the third retainer member 40 to the second retainer member 26 and selectively attaching 1008 the third retainer member 40 to the first retainer member 24 to couple together the first and second members 16, 18, such as the panel 18 and the windshield 16. Generally, attaching 1006 the third retainer member 40 to the second retainer member 26 occurs before attaching 1008 the third retainer member 40 to the first retainer member 24. Having the third retainer member 40 selectively attachable to the first and second retainer members 24, 26 allows for easy accessibility and replaceability of various components, such as the panel 18, the strip 80, the second or third retainer members 26, 40, etc.

In certain embodiments, attaching 1006 the third retainer member 40 to the second retainer member 26 can include moving one side wall 56 of the second part 46 of the third retainer member 40 through the slot 38 of the second retainer member 26 such that the distal wall 36 of the second retainer member 26 is disposed in the second opening 48 of the second part 46. Furthermore, in certain embodiments, attaching 1008 the third retainer member 40 to the first retainer member 24 can include moving the third retainer member 40 onto the second end portion 30 of the first retainer member 24 and toward the first end portion 28 such that the second end portion 30 is disposed in the first opening 44 of the first part 42 of the third retainer member 40. More specifically, in certain embodiments, attaching 1006 the third retainer member 40 to the second retainer member 26 can include sliding one side wall 56 of the second part 46 of the third retainer member 40 through the slot 38 of the second retainer member 26 such that the distal wall 36 of the second retainer member 26 is disposed in the second opening 48 of the second part 46. Furthermore, in certain embodiments, attaching 1008 the third retainer member 40 to the first retainer member 24 can include sliding the third retainer member 40 onto the second end portion 30 of the first retainer member 24 and toward the first end portion 28 such that the second end portion 30 is disposed in the first opening 44 of the first part 42 of the third retainer member 40. Simply stated, the first part 42 of the third retainer member 40 is slid onto the second end portion 30 of the first retainer member 24 to couple the panel 18 to the windshield 16. Therefore, sliding one side wall 56 of the second part 46 of the third retainer member 40 through the slot 38 occurs before sliding the third retainer member 40 onto the second end portion 30 of the first retainer member 24. As such, during assembly of the vehicle 10, the panel 18 is generally moved toward the windshield edge 64 along an axis 86 substantially parallel to the windshield which can improve assembly efforts. More specifically, the panel 18 can be slid toward the windshield 16 along the axis 86 (see FIG. 3). In other words, sliding the panel 18 along the axis 86 can improve ergonomic efforts. Therefore, generally, deflection of the first retainer member 24 is minimized during assembly of the vehicle 10.

It is to be appreciated that the order or sequence of performing the method 1000 as identified in the flowchart of FIG. 7 is for illustrative purposes and other orders or sequences are within the scope of the present disclosure. It is to also be appreciated that the method 1000 can include other features not specifically identified in the flowchart of FIG. 7.

The assembly 12 can be utilized for many different vehicle designs, thus providing uniformity which can reduce manufacturing costs. Additionally, the first, second and third retainer members 24, 26, 40 cooperate to allow adjustability of the panel 18 relative to the strip 80, and also allows the first side surface 66 of the windshield 16, the first side 74 of the panel 18 and the distal surface 82 of the strip 80 to present the substantially flush appearance. In addition, the assembly 12 configuration reduces packaging size. Furthermore, shipping of the windshield 16 is simplified by eliminating the need for a filler (as discussed in the background section), thus reducing costs and assembly time of the assembly 12.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An assembly for a vehicle, the assembly comprising:
a windshield;
a panel disposed adjacent to the windshield;
a first retainer member secured to one of the windshield and the panel;
a second retainer member secured to the other one of the windshield and the panel, with the first and second retainer members spaced from each other; and
a third retainer member selectively attached to the first and second retainer members to selectively couple together the panel and the windshield.

2. An assembly as set forth in claim 1 wherein the first retainer member is secured to the windshield and the second retainer member is secured to the panel.

3. An assembly as set forth in claim 2 wherein the second retainer member includes a first leg extending away from the panel and a second leg extending away from the panel in a spaced relationship relative to the first leg, and wherein the second retainer member includes a distal wall secured to the first and second legs, with the distal wall disposed between the panel and the first retainer member.

4. An assembly as set forth in claim 3 wherein the distal wall is spaced from the panel to define a slot therebetween, and wherein the third retainer member is disposed in the slot to attach the second and third retainer members together.

5. An assembly as set forth in claim 4 wherein the first retainer member includes a first end portion secured to the windshield and a second end portion overlapping the panel in a spaced relationship such that the second retainer member is disposed between the panel and the first retainer member, and with the third retainer member attachable to the second end portion.

6. An assembly as set forth in claim 5 wherein the third retainer member includes a first part defining a first opening to receive the second end portion and a second part defining a second opening to receive the distal wall.

7. An assembly as set forth in claim 6 wherein the second part includes a tab disposed through the slot of the second retainer member to engage an end of the distal wall to retain attachment between the second and third retainer members.

8. An assembly as set forth in claim 1 wherein the third retainer member includes a first part defining a first opening to receive the first retainer member and a second part defining a second opening to receive the second retainer member.

9. An assembly as set forth in claim 8 wherein the first opening is positioned in an inverted relationship with respect to the second opening such that the first and second openings face in substantially opposite directions.

10. An assembly as set forth in claim 9 wherein the third retainer member defines a generally s-shaped configuration to present the first and second openings in the inverted relationship.

11. An assembly as set forth in claim 8 wherein the first part includes a first base and a pair of side walls extending from the first base in a spaced relationship to define the first opening therebetween.

12. An assembly as set forth in claim 11 wherein the second part includes a second base and a pair of side walls extending from the second base in a spaced relationship to define the second opening therebetween.

13. An assembly as set forth in claim 12 wherein one of the side walls of the first part corresponds to one of the side walls of the second part.

14. An assembly as set forth in claim 8 wherein the first part includes a projection extending from one of the side walls of the first part inwardly into the first opening to engage the first retainer member.

15. An assembly as set forth in claim 1 wherein the windshield includes a windshield edge and the panel includes a panel edge facing the windshield edge, with the windshield edge and the panel edge spaced from each other to define a gap therebetween, and further including a strip secured to the first retainer member and disposed in the gap.

16. An assembly as set forth in claim 15:
wherein the windshield includes a first side surface and a second side surface spaced from each other, with the first retainer member secured to the second side surface,
wherein the panel includes a first side and a second side spaced from each other, with the second side facing the first retainer member, and the second retainer member secured to the second side;
wherein the strip extends outwardly away from the first retainer member to a distal surface; and
wherein the first side surface of the windshield, the first side of the panel and the distal surface of the strip cooperate to present a substantially flush appearance.

17. A vehicle comprising:
a support structure;
a windshield coupled to the support structure;
a panel disposed adjacent to the windshield;
a first retainer member secured to one of the windshield and the panel;
a second retainer member secured to the other one of the windshield and the panel, with the first and second retainer members spaced from each other; and
a third retainer member selectively attached to the first and second retainer members to selectively couple together the panel and the windshield.

18. A vehicle as set forth in claim 17 wherein:
the first retainer member is secured to the windshield and the second retainer member is secured to the panel;
the second retainer member includes a first leg extending away from the panel and a second leg extending away from the panel in a spaced relationship relative to the first leg, and wherein the second retainer member includes a distal wall secured to the first and second legs, with the distal wall disposed between the panel and the first retainer member; and
the distal wall is spaced from the panel to define a slot therebetween, and wherein the third retainer member is disposed in the slot to attach the second and third retainer members together.

19. A vehicle as set forth in claim 18 wherein:
the first retainer member includes a first end portion secured to the windshield and a second end portion overlapping the panel in a spaced relationship such that the second retainer member is disposed between the panel and the first retainer member, and with the third retainer member attachable to the second end portion; and
the third retainer member includes a first part defining a first opening to receive the second end portion and a second part defining a second opening to receive the distal wall.

20. A method of assembling a vehicle, the method comprising:
securing a first retainer member to one of a first member and a second member;
securing a second retainer member to the other one of the first member and the second member, with the first and second retainer members spaced from each other;
selectively attaching a third retainer member to the second retainer member; and
selectively attaching the third retainer member to the first retainer member to couple together the first and second members, wherein attaching the third retainer member to the second retainer member occurs before attaching the third retainer member to the first retainer member.

* * * * *